United States Patent

Pickles

[15] 3,659,466
[45] May 2, 1972

[54] WINDOW REGULATOR MECHANISM

[72] Inventor: Joseph Pickles, Birmingham, Mich.
[73] Assignee: Ferro Manufacturing Corporation, Detroit, Mich.
[22] Filed: May 4, 1970
[21] Appl. No.: 34,423

[52] U.S. Cl. ..................................74/89.18, 49/350, 192/8
[51] Int. Cl. ......................................................F16h 27/02
[58] Field of Search ....................74/89.18, 626; 49/348, 349, 49/350, 351; 192/8

[56] References Cited

UNITED STATES PATENTS

| | | | |
|---|---|---|---|
| 2,186,823 | 1/1940 | De Tar | 74/626 |
| 2,621,540 | 12/1952 | Rath | 74/626 |
| 2,621,541 | 12/1952 | Rath | 74/626 |
| 2,621,544 | 12/1952 | Rossmann | 74/626 |
| 2,070,941 | 2/1937 | Dust | 49/350 |
| 2,665,904 | 1/1954 | Lehmann | 192/8 |
| 3,203,691 | 8/1965 | Pollak | 49/351 |

*Primary Examiner*—William F. O'Dea
*Assistant Examiner*—Wesley S. Ratliff, Jr.
*Attorney*—Whittemore, Hulbert & Belknap

[57] ABSTRACT

A window regulator particularly for the rear window of station wagons, comprising a mounting plate having an enlarged toothed opening forming the internal gear of a planetary gear set. A regulator arm has at one end a drive plate fixed to the arm in spaced relation. Planet gears are provided between the drive plate and arm and are rotatable thereon about fixed axes. The planet gears mesh with the internal gear and are driven by an input sun gear. Preferably, a second arm is pivoted to the mounting plate and the two arms have meshing gear sectors formed thereon.

10 Claims, 3 Drawing Figures

PATENTED MAY 2 1972

3,659,466

INVENTOR.
JOSEPH PICKLES
BY Whittemore,
Hulbert & Belknap
ATTORNEYS

3,659,466

WINDOW REGULATOR MECHANISM

BRIEF SUMMARY OF THE INVENTION

The window regulator comprises a mounting plate adapted to be secured inside a frame portion of the automobile such for example as beneath the window opening in the rear closure of a station wagon.

The mounting plate has an enlarged opening therein provided with teeth forming an internal gear of a planetary gear set. A pair of sector arms are provided having meshing sectors interconnecting the arms to provide for simultaneous equal but opposite swinging movement of both arms. One of the arms is provided with a drive plate adjacent one end, the drive plate being spaced from the adjacent end of the arm by an amount to provide for reception of a plurality, preferably three, planet gears. The planet gears are rotatably mounted in fixed position relative to the plate and arm by means of sharply upset or embossed projections in both the drive plate and the arm, the projections extending into circular openings in the planet gears and forming a rotatable mounting therefor.

The planet gears are in mesh with the internal gear and a central sun gear is provided intermediate the planet gears.

The sun gear is mounted on a pin which extends through an opening in the sector arm and through an opening in a cover plate fixed to the mounting plate. Accordingly, the sector arm is mounted for rotation essentially about a pin supported in part by the cover and in part by gearing which includes the internal gear formed as a part of the stationary mounting plate. The sun gear is connected to an enlarged idler gear which extends radially of the mounting pin beyond the drive plate where it meshes with an input pinion which in turn is preferably connected to a suitable crank for manual operation.

The input pinion preferably is associated with a spring type clutch, details of which form no part of the present invention but which serves to retain the window closed or in intermediate position against forces applied directly to the window tending to open it.

DETAILED DESCRIPTION

Figure 1:
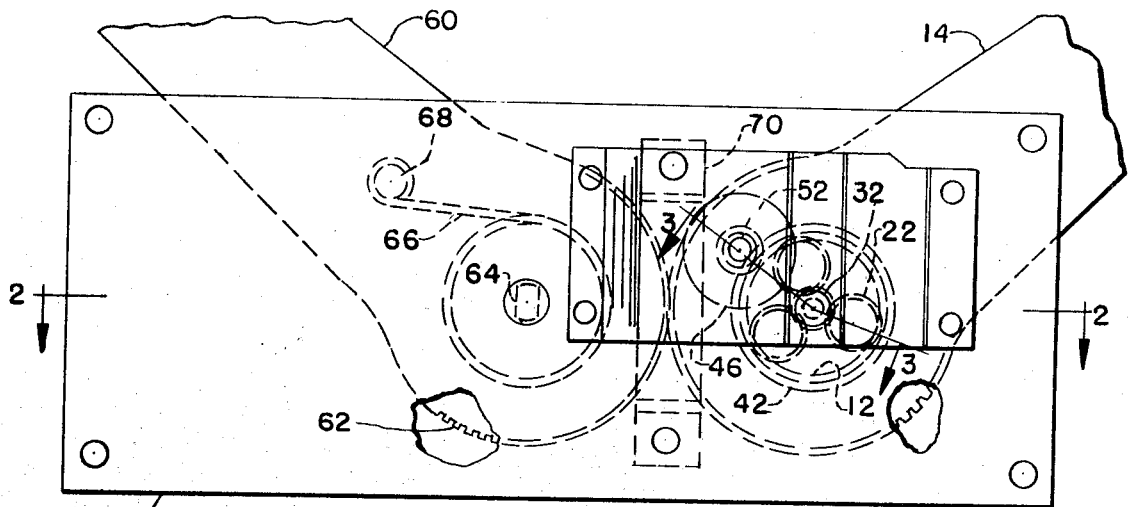
FIG. 1 is an elevational view of the window regulator mechanism.
Figure 2:
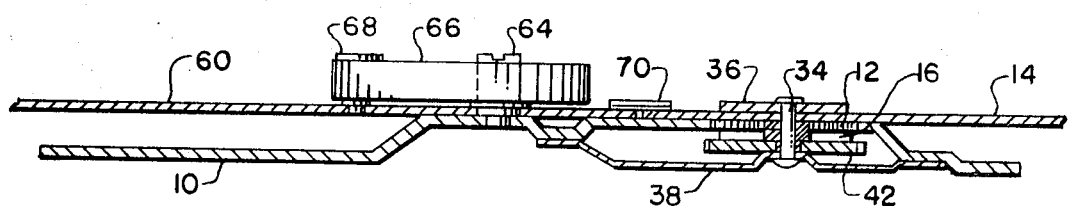
FIG. 2 is a sectional view on line 2—2, FIG. 1.
Figure 3:
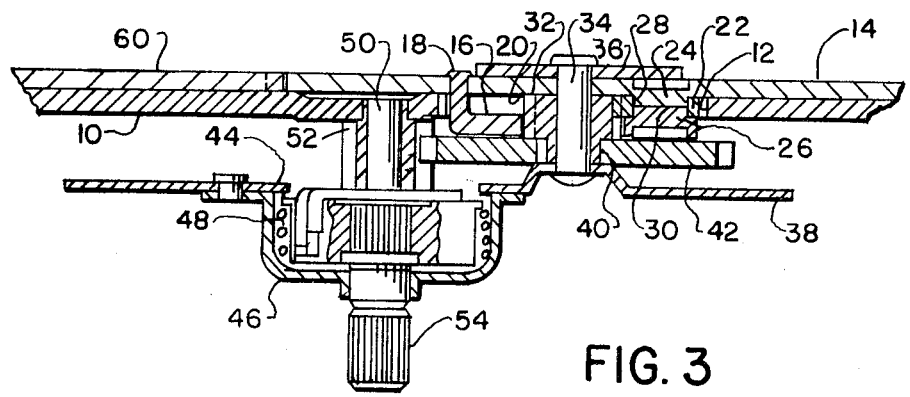
FIG. 3 is an enlarged sectional view on the line 3—3, FIG. 1.

The window regulator mechanism comprises a mounting plate 10 of generally rectangular shape but having an embossed configuration best illustrated in FIG. 2. Adjacent one end of the mounting plate 10 there is provided an enlarged opening 12 having radially inwardly extending teeth forming the internal gear of a planetary gear set.

Mounted for rotation on the mounting plate 10 is a regulator or sector arm 14 to which a drive plate 16 is affixed by a plurality of laterally extending tangs 18 the ends of which extend through openings in the arm 14 and which are upset to provide a permanent fixed driving connection therebetween. The intermediate portion of the drive plate is laterally spaced from the adjacent end of the arm 14 leaving a space 20 which receives a plurality, preferably three, planet gears 22. The planet gears 22 are provided in equally spaced relation about the axis of the internal gear 12 and are in mesh therewith. Preferably, the mounting for the planet gears comprises sharply upset or embossed projections 24 and 26 which extend into the central openings 28 of the planet gears and preferably abut therein as indicated at 30. This construction provides the simplest possible arrangement for appropriately connecting the plurality of planet gears in driving relation to the drive plate 16 and the associated sector arm 14.

A sun gear 32 is provided intermediate the planet gears 22 in mesh therewith and the sun gear 32 is mounted for rotation on a pin 34 which extends through an opening adjacent one end of the arm 14 and through a matching opening in a reinforcing plate 36. The opposite end of the pin extends through an opening in a cover 38. The sun gear 32 has a reduced splined end 40 to which is connected an enlarged idler gear 42, the idler gear having a radial dimension such that it extends laterally beyond the side or edge of the drive plate 16.

The cover 38 is provided with an enlarged opening 44 and receives a cup-shaped housing 46 which receives a spring clutch mechanism indicated generally at 48. Details of the clutch form no part of the present invention and it will not be further described.

Extending through the housing 46 is an elongated shaft 50 the inner end of which receives an input pinion 52 which is connected to be driven through the clutch mechanism when rotation is imparted to the knurled shaft end 54 by suitable mechanism such for example as a crank (not shown). The input pinion 52 is of course in mesh with the idler gear 42, which in turn drives the sun gear in rotation about the pin 34. This in turn causes the planet gears 22 to revolve about the internal gear 12. Since the planet gears are rotatable about fixed axes provided by the embossed projections 24 and 26, this results in angular movement of the arm 14.

With the mechanism so far described, it will be observed that the arm 14 is in extended surface contact with the flat surface of the mounting plate 10 and is mounted for rotation by means which includes the drive plate 16 and the planet gears 22 which in turn are centered with respect to the stationary internal gear 12 formed by the teeth in the stationary mounting plate 10. The construction is further located by means of the pin 34 which mounts the sun gear 32 as well as the idler gear 42, which pin has one end received in an opening provided in the fixed cover 38 which is rigidly secured to the mounting plate 10.

Secured to the mounting plate 10 is a second sector arm 60, the two sector arms having toothed sector portions 62 in mesh with each other so that rotation of the first described sector arm 14 causes identical but opposite rotation of the arm 60. The arm 60 is mounted for rotation on a pin 64 and preferably is biased in one direction by a coil spring 66 one end of which is anchored to a pin 68 carried by the sector arm 60. The spring 66 biases the sector arms upwardly to relieve the operator of some of the force required to move the window toward its upper or closed position.

Since the sector arms 14 and 60 are formed of relatively thin material, it is desirable to insure maintenance of proper meshing relation between the teeth of the toothed sectors 62 and this means comprises a guide plate 70 the ends of which are attached to the mounting plate and the intermediate portion of which overlies the meshing portions of the toothed sectors, as best illustrated in FIG. 2.

It will be observed that the planet gears 22 are received between the flat confronting surfaces of the arm 14 and the drive plate 16, and are retained in coplanar relationship to the internal gear 12 formed in the mounting plate 10. Moreover, since the projections 24 and 26 which mount the planet gears for rotation, are in abutment within the openings 28 in the planet gears, the sides of the planet gears are guided in rotation between these surfaces while undesirable friction is prevented by reason of the abutment of the projections.

What I claim as my invention is:

1. A window regulator comprising
a mounting plate having an enlarged circular opening therein the periphery of which is toothed to form an internal gear,
a sector arm,
means pivotally mounting said arm on said mounting plate at one side thereof at said opening, said means comprising
a drive plate having its intermediate portion located at the opposite side of said mounting plate at said opening and spaced from said arm to define a space between the intermediate portion of said drive plate and the adjacent end of said arm,
means extending through the opening in said mounting plate and rigidly connecting said driving plate to said arm, a plurality of planet gears mounted in the space between said arm and the intermediate portion of said drive plate and in the opening in said mounting plate and in mesh with said internal gear, means on said arm and drive plate mounting said planet gears for rotation about their axes and for angular movement with said arm and drive plate about the axis of said internal gear, a sun gear in mesh with said planet gears, means mounting said sun gear for rotation about the axis of said internal gear, and drive means connected to said sun gear to rotate the sun gear and to cause said planet gears together with said drive plate and arm to move angularly about the axis of said sun gear.

2. A window regulator as defined in claim 1 in which the planet gears have central openings and in which the portions of the sector arm and drive plate have sharply embossed projections extending into the openings to provide rotatable mounting means for the planet gears.

3. A window regulator as defined in claim 1 in which the sector arm is connected to one end of a pin, said sun gear being rotatably mounted on said pin, and a cover connected in spaced relation to said mounting plate and overlying said drive plate and sun gear and having an opening supporting the other end of said pin.

4. A window regulator as defined in claim 3 comprising an idler gear intermediate said drive plate and said cover and extending radially of said pin beyond the outer edge of said drive plate, and an input pinion journaled in part in said mounting plate and in mesh with said idler gear.

5. A window regulator as defined in claim 1 comprising a second sector arm pivoted to said mounting plate, said sector arms having toothed inter-meshed sectors insuring equal but opposite angular movement thereof upon rotation of said sun gear.

6. A window regulator as defined in claim 5 in which the toothed sectors of said arm are formed of flat relatively thin material in sliding relation to a surface of said mounting plate, and a guide plate overlying the zone of mesh of said sector arms and in sliding contact with the adjacent surfaces thereof to maintain the teeth of said toothed sectors in mesh.

7. A power reduction unit comprising a mounting plate having a circular toothed opening therein constituting an internal gear, an output member, means mounting said member on said plate at one side thereof for angular movement relative thereto about the axis of said gear, a drive plate located at the other side of said plate and fixed to said member by means extending through the opening in said plate and in laterally spaced relation to said member to define a space therebetween surrounding the axis of said gear, a plurality of planet gears in said space having a thickness substantially equal to the spacing between said drive plate and member, pivot means fixed with respect to said output member and drive plate and extending into the toothed opening in said mounting plate to provide fixed axes of rotation for said planet gears relative to said drive plate and member, a sun gear, means rotatably mounting said sun gear on said mounting plate intermediate said planet gears and in mesh therewith, and means for driving said sun gear in rotation.

8. A unit as defined in claim 7 in which the pivot means supporting the planet gears for rotation comprise sharply embossed projections formed in said member and drive plate extending into the openings in said planet gears and abutting therein.

9. A power reduction unit comprising a mounting plate having a circular toothed opening therein constituting an internal gear, an output member, means mounting said member on said plate in sliding contact with one side thereof for angular movement about the axis of said internal gear, a drive plate having a central portion spaced laterally from said member at said opening and rigidly connected thereto by means extending through the opening in said mounting plate, a cover plate fixedly secured to said mounting plate at the side thereof remote from said output member, a pin extending through the opening in said drive plate and an opening in said output member, a sun gear rotatably mounted on said pin and having a portion located between the spaced portions of said output member and drive plate, 10. A unit as defined in claim 9 in which the pivot means on the assembly of said output member and said drive plate comprise confronting projections from said member and plate extending into openings provided in said planetary pinions.

* * * * *